June 2, 1959    S. L. TODERICK    2,888,833
COUNTER DRIVE
Filed Sept. 21, 1954

INVENTOR.
SAMUEL L. TODERICK
BY
ATTORNEYS

United States Patent Office 2,888,833
Patented June 2, 1959

2,888,833

COUNTER DRIVE

Samuel L. Toderick, Welland, Ontario, Canada, assignor to John Deere Plow Company (Limited), Welland, Ontario, Canada, a corporation of Canada Application September 21, 1954, Serial No. 457,451

1 Claim. (Cl. 74—434)

The present invention relates generally to agricultural implements and more particularly to new and improved land measuring devices therefor.

The object and general purpose of the present invention is the provision of a new and improved drive gearing between the operating part of an agricultural implement and a counter designed and constructed to indicate or register the acreage covered by the machine. More particularly, it is a feature of the present invention to provide an adjustable drive gearing especially arranged to be mounted on an implement of the variable size type. For example, certain disk tillers are manufactured in different sizes, such as a 12-foot size, a 16-foot size, or a 20-foot size, and it is particularly a feature of this invention to provide a drive gearing by which the counter device, which may be common for all sizes of implements, may be driven at the correct rate for the selected implement size.

Specifically, it is an object of this invention to provide drive gearing in which one of the gears has teeth that selectively may be bent out of operating position with respect to the associated gear or gears, whereby, by bending down one or more of the teeth, the proper ratio may be readily obtained for any given implement size.

These and other objects and advantages of the present invention will be apparent to those skilled in the art after a consideration of the following detailed description, taken in conjunction with the accompanying drawings, in which.

In the copending application, Ser. No. 85,159, filed April 2, 1949, by John H. Starr, now U.S. Patent 2,695,576 issued November 30, 1954, there is disclosed a novel disk tiller implement having a main or base section and one or more auxiliary sections, and by using all sections an implement operating a strip of ground approximately twenty feet wide is provided. By removing one or more of the auxiliary sections, the width of the machine may be reduced from twenty feet to sixteen feet, or to twelve feet, and by removing all auxiliary sections, the operating width of the machine is reduced to that of the main or base section alone, which in the present commercial form is eight feet. The land measurer drive of the present invention is particularly adapted for implements of this kind and is so constructed and arranged that the land measurer and drive therefor may be mounted on the base implement, the drive being readily and conveniently adjusted for securing the proper registration of the acreage covered, whether the implement is an 8-foot, 12-foot, 16-foot or 20-foot size. It will be understood, of course, that this reference to particular dimensions is for purposes of explanation only.

Figure 1:
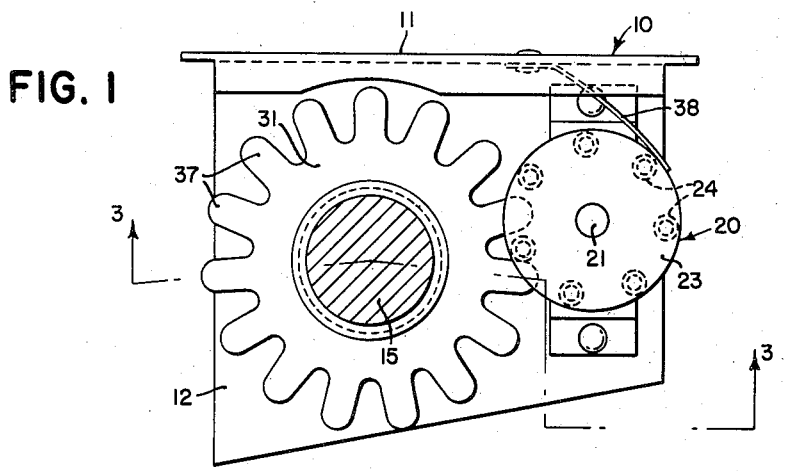
Fig. 1 is a side view of the operating shaft of an agricultural implement and the associated gearing and counter mechanism with which the implement is equipped.
Figures 2, 3:
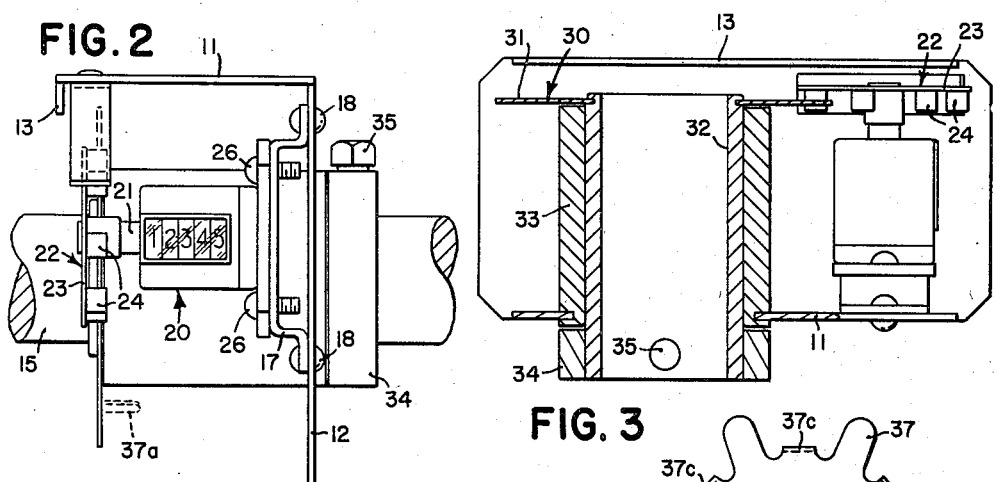
Fig. 2 is an nend view of the apparatus shown in Fig. 1, being a view taken from the right side as viewed in Fig. 1.
Fig. 3 is a sectional view taken generally along the line 3—3 of Fig. 1.

Referring now to Fig. 1, the land measurer and associated drive mechanism comprises a support 10 adapted to be attached to the underside of the hopper, or other suitable part of the implement, the support 10 including a horizontal section 11 and a generally vertical section 12 extended downwardly from the horizontal section 11 at one side thereof and a depending flange 13 extending downwardly from the other side of the horizontal plate 11. The depending plate section 12 is apertured to receive the jackshaft 15 that constitutes a part of the main implement and is rotated by any suitable means for the purpose of selecting and dispensing seed as the implement is drawn across a field.

A bracket 17 is secured, as by rivets 18, to the plate 12 and forms a support for a revolution counter 20 that is of conventional construction, having a shaft 21 that is adapted to be driven by any suitable means. According to the principles of the present invention, secured to the shaft 21 is a fabricated sprocket wheel 22 that comprises a disk-like plate 23 and a plurality of cylindrical studs 24 thereon forming tooth-receiving elements. Rotation of the fabricated sprocket wheel 22 actuates the counter 20, the latter being arranged to indicate the number of acres traversed by the machine. The counter 20 is fixed to the bracket 17 by any suitable means, such as screws 26.

For the purpose of actuating the counter wheel 22, I provide a drive gear 30 that includes a stamped sheet metal sprocket 31 of relatively thin and deformable stock, secured in any suitable way to one end portion of a sleeve 32 that is adapted to encircle the shaft 15. A second sleeve 33 surrounds the sleeve 32 and is connected in any suitable way to the plate 11 so as to be held against axial displacement relative thereto. A collar 34 surrounds the other end of the drive sleeve 32 and fixes the latter to the seeding jackshaft 15 by a set screw 35.

As will best be seen from Fig. 1, the sheet metal sprocket 31 is provided with a plurality of rounded radially extended tooth sections 37, there being fifteen teeth in the example shown in Fig. 1. These teeth mesh with the tooth-receiving elements 24 on the counter wheel 22 so that, as will best be seen from Fig. 1, when the seeding jackshaft 15 is driven the counter unit 20 is actuated. The bracket plate 11 carries a spring 38 that rides on the disk 23 and prevents the counter wheel 22 from overrunning.

Figures 4, 5, 6:
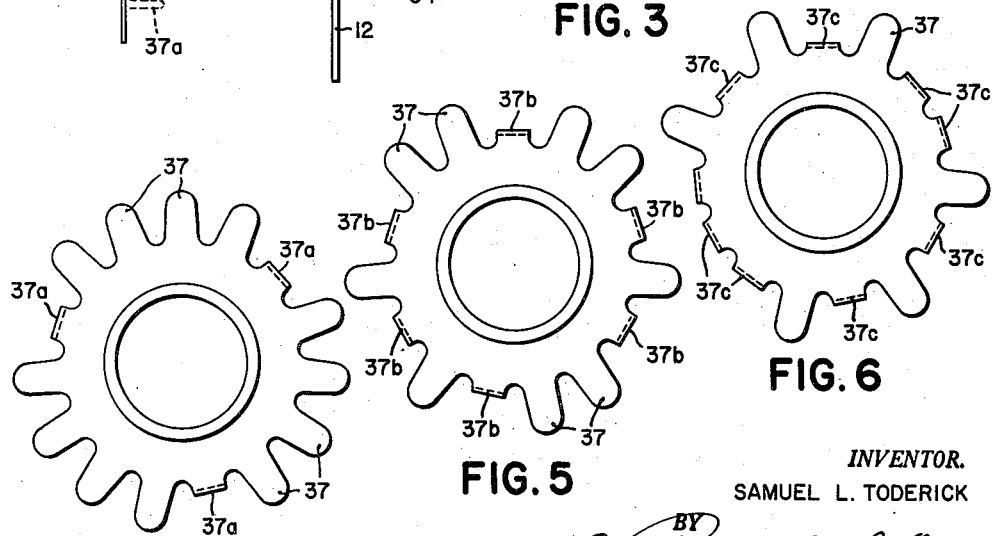
Fig. 4 is a side view of the deformable gear arranged to provide a reduction in the counter drive corresponding to a reduction in implement size from twenty feet to sixteen feet.
Fig. 5 is a similar view of the deformable gear, arranged for a 12-foot implement.
Fig. 6 is another view of the deformable gear, arranged for an implement having an operating width of eight feet.

The stamped sheet metal sprocket 31 is of sufficiently thin stock to permit any selected tooth or teeth 37 to be bent outwardly away from the plane of the wheel so as to be disposed in an inoperative position so far as actuating the elements 24 on the counter wheel 22 is concerned. This provides a very simple adjustment to adapt the counter for any one of the four tiller sizes that are presently conventional in this type of agricultural machine, namely, the 8-foot, 12-foot, 16-foot and 20-foot sizes. When the implement is of the maximum width, all fifteen teeth 37 are employed and none is bent out of the plane of the sprocket 31, all teeth being left intact on the sprocket 31. If the tiller is arranged in the 16-foot size, the user bends down three of the teeth 37, as indicated at 37a in Fig. 4. If the tiller is a 12-foot size machine, the user bends down six of the teeth, as shown at 37b in Fig. 5, and if the machine is the 8-foot size machine, the user bends down nine of the sprocket teeth, as indicated at 37c in Fig. 6. It is not necessary that any particular teeth be bent down, but preferably the bent-down teeth are arranged in spaced apart relation so that the remaining teeth 37 secure as nearly uniform a drive as possible.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

Gearing including a pair of directly cooperating toothed gears mounted for intermeshing generally coplanar relation, one of said gears comprising a member formed of a single sheet of relatively thin metal and having relatively thin integral teeth extending generally radially outwardly in coplanar relation with respect to the plane of said one gear when said integral teeth mesh with the teeth of the cooperating gear, whereby the forces imposed on said relatively thin teeth in operation lie substantially entirely within said plane, the total depth of the integral teeth being such and the spacing between the gear axes being such that the bottoms of the spaces between said integral teeth lie in outwardly spaced relation with respect to the radially outer portions of said other gear, whereby selected ones of said relatively thin teeth may be bent at the root portion laterally outwardly of said plane so as to dispose the teeth so bent out of contacting relation with respect to the toothed portion of the other gear.

References Cited in the file of this patent

UNITED STATES PATENTS

| 11,585 | Bazin | Aug. 22, 1854 |
| 274,459 | Carr et al. | Mar. 27, 1887 |
| 1,229,514 | Pierson | June 12, 1917 |
| 1,282,018 | Albertson | Oct. 22, 1918 |
| 1,454,275 | Frider | May 8, 1923 |
| 1,527,443 | Rudolph | Feb. 24, 1925 |
| 1,914,797 | Baker | June 20, 1933 |
| 2,468,966 | Farmer | May 3, 1949 |
| 2,520,546 | Hughes | Aug. 29, 1950 |

FOREIGN PATENTS

| 614,134 | Germany | June 3, 1935 |

OTHER REFERENCES

Publication: Product Engineering, May 1953, pp. 208 and 209. (Copy in Div. 12.)